Oct. 6, 1959  D. A. ROSE  2,907,116
PIPE BENDER GAUGE

Filed Sept. 6, 1957  2 Sheets-Sheet 1

INVENTOR.
Donald A. Rose
BY
Att'y

Oct. 6, 1959     D. A. ROSE     2,907,116
PIPE BENDER GAUGE

Filed Sept. 6, 1957     2 Sheets-Sheet 2

INVENTOR.
Donald A. Rose
BY
Att'y

United States Patent Office 2,907,116
Patented Oct. 6, 1959

2,907,116
PIPE BENDER GAUGE
Donald A. Rose, Oakland, Calif.

Application September 6, 1957, Serial No. 682,556

1 Claim. (Cl. 33—207)

This invention relates to improvements in pipe bending gauges.

The principal object of this invention is to provide a gauge mechanism wherein a level may be used to ascertain the proper bending of a pipe conduit or the like.

A further object is to provide means for attaching a level to the end of a pipe to be bent whereby the pipe may be brought back to the same level position at each bending operation during the forming of a bend or offset as the case may be.

A further object is to produce a device of this character which is adjustable for various sizes of pipe diameter within the range of the tool.

A further object is to produce a device of this character which may be readily used during the bending operation without danger of the same becoming damaged during the bending and without the necessity of constantly picking up and laying down of the level.

Other objects and advantages will be apparent during the course of the following description.

In the accompanying drawings forming a part of this specification and in which like numbers are employed to designate like parts throughout the same, Fig. 1 is a top plan view of a pipe and bending jig;

Figure 1:
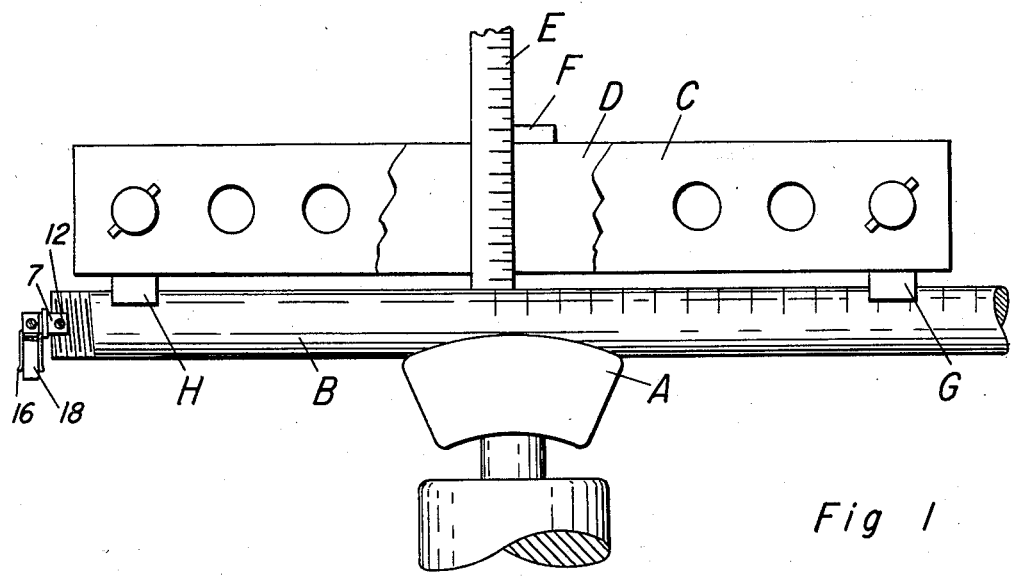
Figure 2:
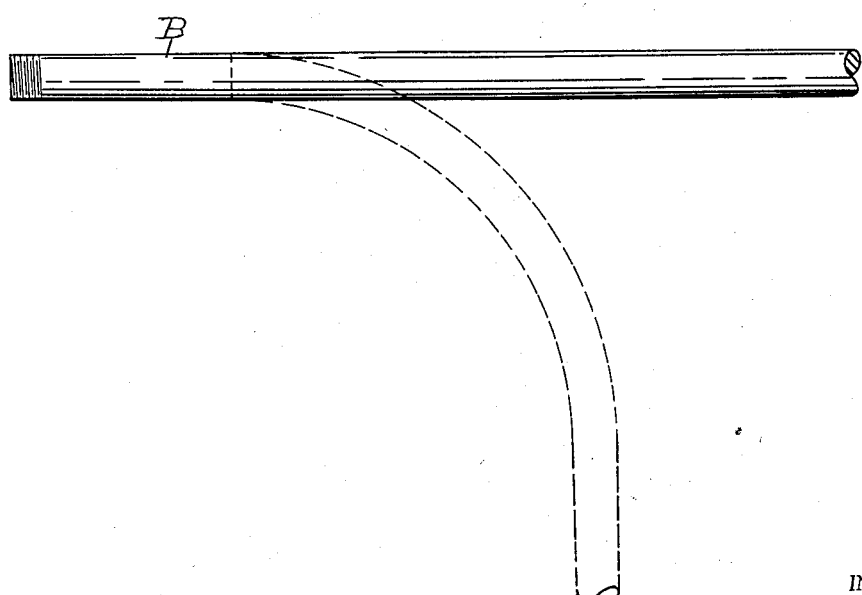
Fig. 2 is a top plan view of the pipe and designating the bending thereof in dotted lines.
Figure 3:
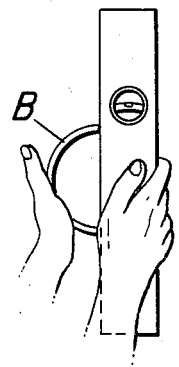
Fig. 3 is an end view of the pipe having a level held adjacent thereto.

In the bending of pipes it is necessary that several individual bends be made along the length of the pipe so as to put a curvature into the pipe of any desired degree and without the danger of crushing the walls of the pipe during the bending operation.

It is therefore customary to measure off along the length of the pipe being bent marks spaced equal distances apart, the distance between the bending marks being determined by the diameter of the pipe; then to place the pipe in a bending jig, which usually consists of a hydraulic curved bending head and a pair of spaced bars and stops between which the pipe is bent through pressure applied to the pipe midway between each mark, and also bending the pipe a pre-determined distance, after which the bending arrangement is loosened and the pipe moved over one space and then bent a further distance and so on until a pre-determined bend has been accomplished.

It is therefore necessary that in applying the pressure to the pipe that the pipe must not be rotated upon its axis between the various bends, otherwise the bend is not true and an offset condition will result.

It has heretofore been the practice to make vertical marks on the end of the pipe, or hack saw marks, so that a level could be held thereagainst after each bending operation.

These methods, however, are inaccurate, time-consuming and the saw marks may cause the threads on the ends of the pipe to become mutilated.

Applicant has therefore devised a gauge which comprises a clamping arrangement having a bar 5 in which are slidably secured angle members 6 and 7, having their ends bent so as to lie parallel with the sides of the pipe. These angle members are adjustably secured to the bar 5 as by screws 8 and 9 respectively.

The angle member 6 carries a yoke 11 while the angle member 7 carries a pointed screw 12. Pivotally secured to the bar 5 is a bracket 13 to the ends of which is pivoted a yoke 14 having clamps 16 and 17 adapted to hold an ordinary spirit level 18.

Figure 4:
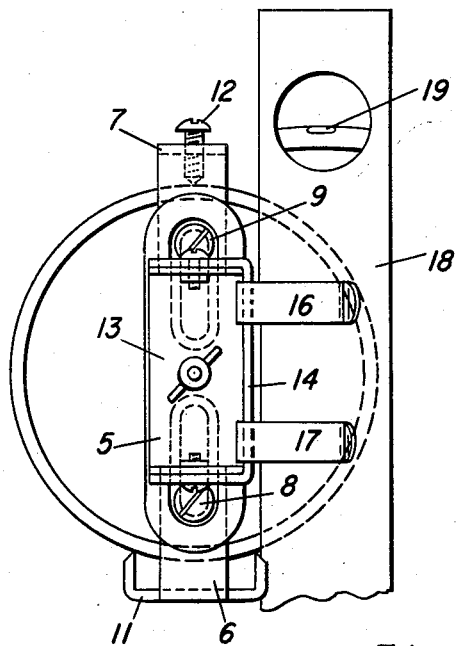
Fig. 4 is an end elevation of the pipe having my gauge attached thereto.
Figure 5:
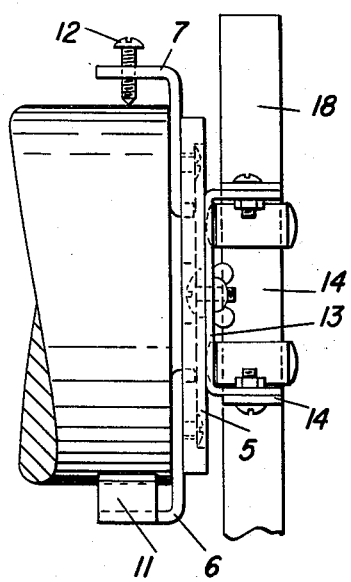
Fig. 5 is a side elevation of my gauge as shown in Fig. 4.

The result of this construction is that when the device is attached to the end of the pipe as shown in Figs. 4 and 5 and a spirit level is mounted in the clamps, the result will be that when the pipe is placed in the jig ready to be bent, it is rotated upon its axis until the bubble 19 of the level shows that the level is being held in exactly vertical position. The first bend is now made by applying pressure to the bending head A which will cause the pipe B to bend between the bars C and D moving the rule E a pre-determined distance along the gauge block F.

As soon as the pre-determined movement has taken place, the pipe is moved toward the left of the drawing by sliding it in the pivoted blocks G and H and pressure again applied.

However, before applying pressure the second time, the pipe is again rotated upon its axis so that the bubble 19 again shows that the end of the pipe is in the same vertical relation as that before the first bend was made.

At each succeeding bend, the pipe is again loosened, moved and again aligned for vertical position before pressure is applied for the succeeding bend.

It will thus be seen that I have produced a device which may be easily attached to any pipe to be bent, and one which will enable the user accurately to determine that the pipe is being bent properly about a given center.

Also, it will thus be seen that I have produced a device which will accomplish all of the objects above set forth. It is to be understood that the form of my invention herewith shown and described is to be taken as a preferred example of the same and that various changes relative to the material, size, shape and arrangement of the parts may be resorted to without departing from the spirit of the invention or the scope of the subjoined claim.

Having thus described my invention, I claim:

A bending gauge for use in bending pipe and comprising a clamp secured to the open end of the pipe to be bent and extending thereacross and coinciding with the diameter of the pipe, a pivoted bracket secured to said clamp and pivoted about the axis of the pipe, pivoted clips carried by said bracket and having their axes parallel to the diameter of the pipe, a level carried by said clips whereby said level may be pivoted about the diameter of said pipe and in any plane.

References Cited in the file of this patent
UNITED STATES PATENTS

| | | |
|---|---|---|
| 1,346,619 | Weathersby | July 13, 1920 |
| 2,601,643 | Sulger | June 24, 1952 |
| 2,842,863 | Hellwig | July 15, 1958 |

FOREIGN PATENTS

| | | |
|---|---|---|
| 60,156 | Switzerland | May 24, 1912 |